(12) United States Patent
Luo et al.

(10) Patent No.: US 7,391,184 B2
(45) Date of Patent: Jun. 24, 2008

(54) SYSTEMS AND METHODS FOR INTEGRATION OF CHARGER REGULATION WITHIN A BATTERY SYSTEM

(75) Inventors: Shiguo Luo, Austin, TX (US); John J. Breen, Harker Heights, TX (US); Ligong Wang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 11/058,781

(22) Filed: Feb. 16, 2005

(65) Prior Publication Data

US 2006/0181244 A1   Aug. 17, 2006

(51) Int. Cl.
*H02J 7/00* (2006.01)
*H02J 3/32* (2006.01)

(52) U.S. Cl. .............. 320/137; 320/112; 320/128; 320/136; 307/48

(58) Field of Classification Search ............... 320/137, 320/9, 136, 128, 112; 307/48
See application file for complete search history.

(56) References Cited

U.S. PATENT DOCUMENTS

| | | | |
|---|---|---|---|
| 5,196,780 A | 3/1993 | Pacholok | |
| 5,200,690 A | 4/1993 | Uchida | |
| 5,420,493 A | 5/1995 | Hargadon et al. | |
| 5,440,502 A | 8/1995 | Register | |
| 5,512,813 A | 4/1996 | Uchinami | |
| 5,523,671 A | 6/1996 | Stewart | |
| 5,528,122 A | 6/1996 | Sullivan et al. | |
| 5,561,361 A | 10/1996 | Sengupta et al. | |
| 5,576,609 A | 11/1996 | Brown et al. | |
| 5,659,239 A | 8/1997 | Sanchez et al. | |
| 5,708,348 A | 1/1998 | Frey et al. | |
| 5,726,554 A | 3/1998 | Freiman et al. | |
| 5,764,035 A | 6/1998 | Lee | |
| 5,847,546 A | 12/1998 | Seengupta et al. | |
| 5,945,811 A | 8/1999 | Hasegawa et al. | |
| 6,064,179 A * | 5/2000 | Ito et al. .................... | 320/128 |
| 6,075,343 A | 6/2000 | Hsu | |
| 6,137,265 A | 10/2000 | Cummings et al. | |
| 6,154,012 A * | 11/2000 | Drori .......................... | 320/162 |
| 6,172,480 B1 | 1/2001 | Vandelac | |

(Continued)

FOREIGN PATENT DOCUMENTS

CN    1531163 A    1/2004

(Continued)

OTHER PUBLICATIONS

Search Report, Application No. SG200600911-2, Jul. 7, 2006, 5 pgs.

(Continued)

*Primary Examiner*—Gary L Laxton
*Assistant Examiner*—Yalkew Fantu
(74) *Attorney, Agent, or Firm*—O'Keefe, Egan, Peterman & Enders LLP

(57) ABSTRACT

One or more charger regulation tasks (e.g., one or more of those tasks typically performed by charger regulator circuitry of a separate battery charging apparatus) are integrated within a battery system (e.g., a battery pack of a portable information handling system) by utilizing component/s common to the battery system (e.g., microcontroller and FET components).

21 Claims, 5 Drawing Sheets

U.S. PATENT DOCUMENTS

| | | | |
|---|---|---|---|
| 6,208,117 | B1 | 3/2001 | Hibi |
| 6,254,832 | B1 | 7/2001 | Rainin et al. |
| 6,377,028 | B1 * | 4/2002 | Armstrong et al. .......... 320/136 |
| 6,380,712 | B2 | 4/2002 | Murphy et al. |
| 6,476,585 | B1 | 11/2002 | Simmonds |
| 6,498,458 | B1 | 12/2002 | Chen |
| 6,501,249 | B1 | 12/2002 | Drori |
| 6,873,135 | B2 | 3/2005 | Nakatsuji |
| 2001/0035733 | A1 | 11/2001 | Murphy et al. |
| 2001/0048288 | A1 | 12/2001 | Hebding et al. |
| 2002/0195996 | A1 | 12/2002 | Nakatsuji |
| 2003/0178967 | A1 | 9/2003 | Khatri |
| 2004/0012368 | A1 | 1/2004 | Massey et al. |
| 2004/0164706 | A1 | 8/2004 | Osborne |
| 2004/0164708 | A1 | 8/2004 | Veselic et al. |
| 2004/0195996 | A1 | 10/2004 | Nishida |
| 2005/0024016 | A1 | 2/2005 | Breen et al. |
| 2005/0112457 | A1 | 5/2005 | Breen et al. |
| 2005/0162123 | A1 | 7/2005 | Sawyers |
| 2006/0022633 | A1 | 2/2006 | Nguyen |

FOREIGN PATENT DOCUMENTS

| | | |
|---|---|---|
| EP | 1037358 A1 | 9/2000 |
| GB | 2183944 A | 6/1987 |
| GB | 2246916 A | 2/1992 |
| GB | 2358299 A | 7/2001 |
| GB | 2359945 A | 9/2001 |
| JP | 08106922 | 4/1996 |
| JP | 08140281 A | 5/1996 |
| JP | 9233727 | 9/1997 |
| JP | 10-075540 | 3/1998 |
| JP | 10-304589 | 11/1998 |
| JP | 11262197 | 9/1999 |
| JP | 11262197 A | 9/1999 |
| JP | 2002017052 A | 1/2002 |
| JP | 2003087990 A | 3/2003 |
| WO | WO99/09635 | 2/1999 |
| WO | WO2004/075371 A1 | 9/2004 |
| WO | WO2005/084343 A2 | 9/2005 |

OTHER PUBLICATIONS

Co-Pending Application Entitled "Battery Systems For Information Handling Systems", U.S. Appl. No. 11/527,126, filed Sep. 26, 2006, 33 pgs.

Co-Pending Application Entitled "AC-DC Adapter And Battery Charger Integration Scheme", U.S. Appl. No. 10/628,921, filed Jul. 29, 2003, 25 pgs.

Co-Pending Application Entitled "Systems And Methods For Regulating Pre-Charge Current In A Battery System", U.S. Appl. No. 11/034,624, filed Jan. 13, 2005, 26 pgs..

Microchip, Pic12F629/675 Data Sheet, 8-Pin Flash-Based 8-Bit CMOS Microcontrollers, 2003, 132 pgs.

Copending Application entitled "Power Architecture For Battery Powered Remote Devices", filed Feb. 22, 2007, U.S. Appl. No. 11/709,675, 28 pgs.

* cited by examiner

SYSTEMS AND METHODS FOR INTEGRATION OF CHARGER REGULATION WITHIN A BATTERY SYSTEM

BACKGROUND OF THE INVENTION

1. Field of the Invention

This invention relates generally to battery systems, and more particularly to integration of charger regulation within a battery system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by battery systems such as lithium ion ("Li-ion") or nickel metal hydride ("NiMH") battery packs including one or more rechargeable batteries. FIG. 1 shows a battery system 120 of a portable information handling system 100 having battery charge terminals 122, 124 that are temporarily coupled to corresponding charge output terminals 115, 116 of a battery charging apparatus 110. As so configured, battery charging apparatus 110 is coupled to receive current from current supply terminals 112, 114 (e.g., alternating current, or direct current from an AC adapter) and to provide DC charging current to battery charge terminals 122, 124 of battery system 120 via charge output terminals 115, 116. As shown, battery system 120 also includes battery system data bus (SMBus) terminals 126, 128 for providing battery state information, such as battery voltage, to corresponding battery charging apparatus data bus terminals 117, 118.

FIG. 2 shows a conventional battery system 120 coupled to a battery charging apparatus 110. As shown, battery system 120 has a battery management unit ("BMU") 202 responsible for monitoring battery system operation and for controlling battery system charge and discharge circuitry 270 that is present to charge and discharge one or more battery cells of the battery system. BMU 202 includes microcontroller and analog front end ("AFE"). Charge and discharge circuitry 270 of battery system 120 includes two field effect transistors ("FETs") 214 and 216 coupled in series between battery charge terminal 122 and battery cell/s 224. FET 214 is a charge FET switching element that is controlled by the microcontroller and/or AFE of BMU 202 to allow or disallow charging current to the battery cell/s 224, and FET 216 is a discharge FET switching element that is controlled by microcontroller and/or AFE of BMU 202 to allow or disallow discharge current from the battery cell/s 224. As shown, body diodes are present across the source and drain of each FET switching element, i.e., to conduct charging current to the battery cell/s when the discharge FET switching element 216 is open, and to conduct discharging current from the battery cell/s when the charge FET switching element 214 is open.

During normal battery pack operations both charge and discharge FET switching elements 214 and 216 are placed in the closed state, and BMU 202 monitors voltage of battery cell/s 224. Upon detection of a battery over-voltage condition, BMU 202 opens the charge FET switching element 214 to prevent further charging of the battery cell/s until the over-voltage condition is no longer present. Similarly, upon detection of a battery under-voltage (or over-discharge) condition, BMU 202 opens the discharge FET switching element 216 to prevent further discharging of the battery cell/s until the under-voltage condition is no longer present. BMU 202 may also open the charge FET switching element 214 when the battery pack is in sleep mode. A current sense resistor 212 is present in the battery pack circuitry to allow an AFE of BMU 202 to monitor charging current to the battery cell/s. If the charge FET switching element 214 is supposed to be open (e.g., during sleep mode or battery over-voltage condition) but charging current is detected, BMU 202 permanently disables the battery pack by blowing an inline fuse 222 present in the battery circuitry to open the battery pack circuitry and prevent further over-charging.

When Li-ion and NiMH battery cells have been discharged to a certain low voltage level, they are not ready to receive their full charging current and must be "pre-charged" at a much lower current level. For example, a typical minimum charging current from a smart charger is 128 milliamperes, which may be sufficiently low for pre-charging some NiMH battery cells. However, the required pre-charge current for other types of battery cells may be much lower than 128 milliamperes. For a typical Li-ion battery cell, the required pre-charge current is about 20 milliamperes or less per cell. To provide the required pre-charge current, separate pre-charge circuitry has been incorporated into a battery pack to achieve the desired pre-charge current level by reducing the charging current supplied by a battery charging apparatus.

FIG. 2 illustrates pre-charge circuitry that is present in charge and discharge circuitry 270 to pre-charge battery cell/s 224 when battery cell/s 224 have been discharged to a predetermined low voltage level and are not ready to receive their full charging current. As shown, the pre-charge circuitry includes FET 252, used as a switch, and a resistor 254 to limit the level of the pre-charge current to a much lower current value than the charging current provided by battery charging apparatus 110. During pre-charging mode, the microcontroller of BMU 202 turns on FET 252 when BMU 202 detects that voltage of battery cell/s 224 is below the predetermined low voltage level and the pre-charge current level is needed. During pre-charge mode, BMU 202 also maintains charge FET switching element 214 in open state to limit the charging current provided to battery cell/s 224 to the lower pre-charge current level. When voltage of battery cell/s 224 reaches the predetermined low voltage level, BMU 202 turns off FET 252 and closes charge FET switching element 214 to allow the full charging current to be provided to battery cell/s 224.

As shown in FIG. 2, battery charging apparatus 110 is coupled to receive current from AC adapter 202 through current supply terminals 112, 114, and to provide DC charging current to battery charge terminals 122, 124 of battery system 120 via charge output terminals 115, 116. Battery charging apparatus 110 includes charger regulation circuitry 204 that itself includes charger controller (U1) 206. Charger controller 206 is an analog controller with some digital functionality, and is configured to communicate with BMU 202 through system BIOS of portable information handling system. As previously described, battery system 120 includes SMBus terminals 126, 128 for providing battery state information, such as battery voltage and current, to system embedded controller 131.

As shown, charger controller 206 is coupled to control charger control FET (Q1) 210 by opening and closing FET 210 in order to implement switching-mode maintenance charge by regulating the duty-ratio of pulse so as to provide proper charging current from battery charging apparatus 110 to battery system 120 through inductor (L1) 220 and current sense resistor (Rs2) 223. Charger controller 206 is coupled across current sense resistor 223 as shown to monitor flow of charging current through inductor 220. Charger controller 206 is also coupled to control power selector FET (Q2) 213 so that FET 213 is open when voltage of battery charging apparatus 110 is high relative to battery system 120 (e.g., when adapter 202 is supplying current during charging of battery system 120), but so that power selector FET 213 is closed when voltage of battery charging apparatus 110 is low relative to battery system 120 (e.g., when adapter 202 is supplying no current and portable information handling system 100 is being supported via current path 230 from battery cell/s 224). In this regard, when portable information handling system 100 is operating on battery power, power selector FET 213 is closed in order to reduce power loss and voltage drop on body diode of Q2 and provide a more direct current path from battery cell/s 224 to electronic circuitry of system 100 through closed discharge FET 216 and closed FET 213. When adapter 202 is supplying current to system load 230 and charge battery cell/s 224, power selector FET 213 is open so that charging current and voltage are regulated and supplied to battery cell/s 224 through regulator circuitry 204 and closed charge FET 214.

As further illustrated in FIG. 2, ground connection 245 is provided within charger regulation circuitry 204. Also present within charger regulation circuitry 204 is diode (D1) 226 for the purpose of current free-wheeling (providing current path for inductor 220) when controlled FET Q1 is turned off, and capacitor (C1) 225 is present within charger regulation circuitry 204 for the purpose of filtering. Charger controller 206 receives power for operation from power circuits 250 and 252. Charger controller 206 is also coupled across current sense resistor (Rs1) 228 for monitoring flow of current to charging apparatus 110 from adapter 202. Also shown present within charging apparatus 110 is soft start FET 290 provided for purposes of to limit the startup inrush current from adapter 202, and isolation FET 292 provided for purposes of isolating power supply of battery when no current is supplied by adapter 202, e.g., when portable information handling system 100 is supported from battery cell/s 224.

In the conventional configuration of FIG. 2, a total of five power FETs (i.e., FETs 210, 213, 214, 216 and 252), two current sense resistors (i.e., resistors 212 and 223) two controllers (i.e., charger controller 206 and microcontroller of BMU 202) are present in the combination of charger regulation circuitry 204 and battery system 120. At the same time, microcontroller utilization within BMU 202 of battery system 120 is typically low (e.g., 10% utilization). It has also been known to provide these two controllers within a single battery system. In such a two-controller configuration, the charger controller has been provided as part of charger regulation circuitry included in the single battery system, and the separate and second BMU microcontroller has been provided that is part of the battery system BMU.

SUMMARY OF THE INVENTION

Disclosed herein are systems and methods for integrating one or more charger regulation tasks (e.g., one or more of those tasks typically performed by charger regulator circuitry of a separate battery charging apparatus) within a battery system (e.g., within a BMU of a battery pack of a portable information handling system). Advantageously, the disclosed systems and methods may be implemented in one embodiment as a relatively low cost scheme for integrating charger regulation tasks within a battery system, such as a battery pack of a portable information handling system. In this regard, traditional component/s of the battery system (e.g., BMU microcontroller and FET components of a battery pack) may be leveraged to realize charger regulator functionality within the battery system rather than within a separate battery charging apparatus. For example, the disclosed systems and methods may be implemented in one embodiment to utilize a BMU microcontroller of a battery system (e.g., battery pack of a portable information handling system) to adjust charging current and voltage, thus eliminating the need for the provision of a separate charger controller within charger regulation circuitry of an associated battery charging apparatus. In such an embodiment, microcontroller BMU utilization efficiency may be increased, and system cost reduced.

Such an implementation allows for the elimination of multiple components from a battery charging apparatus (e.g., FETs 210, 213 and 252, resistor 254, current sensor resistor 223, and charger controller 206 of conventional battery charging apparatus 110 of FIG. 2), leading to substantial cost savings. This makes possible the elimination of duplicated/redundant components in the charge and discharge current paths of a conventional battery apparatus and battery system combination, such as illustrated in FIG. 2. For example, FET 210 and FET 214 of FIG. 2 have duplicated function during charging of battery cell/s 224, in that controlled charge current (power flow) is flowing though both FETs 210 and 214. Similarly, when battery cell/s 224 are supplying power, FET 213 and FET 216 have a similar redundant discharge function, in that discharge current flow is flowing through both FETs 213 and 216. A similar redundant situation exists with respect to current sense resistors 223 and 212 of FIG. 2. Similarly, with regard to the redundancy of charger controller 206 and BMU 202 of FIG. 2, as previously described resource utilization of BMU 202 of FIG. 2 may be lower than 10% in terms of memory, registers, calculation capability, etc. Using the disclosed systems and methods makes it possible to use a BMU to control battery charging parameters instead of using a separate independent charger controller. Thus, in addition to reducing hardware costs, the disclosed systems and methods also allow reduction in costs associated with controller software/firmware.

In a further embodiment, pre-charge circuitry tasks may also be implemented within the battery system (e.g., battery pack of a portable information handling system) by using a pre-designed current control mode. Such a pre-designed current control mode may be implemented to eliminate the need for separate pre-charge circuitry components (e.g., FET 252 and resistor 254 of conventional battery charging apparatus 110 of FIG. 2) leading to further cost savings.

In one embodiment, the disclosed systems and methods may be implemented by incorporating a relatively small amount of logic and interface circuitry into the BMU of a battery system (e.g., battery pack of a portable information handling system) to provide the ability to monitor system voltage and current in real time, and the ability to dynamically control required charge current to the battery cell/s of the battery system. In one exemplary embodiment, a relatively small amount of logic circuitry may be integrated into the BMU microcontroller chip to provide these abilities.

In the implementation of various embodiments of the disclosed systems and methods one or more advantages may be achieved over existing conventional rechargeable battery configurations. Examples of these advantages include, but are not limited to, cost savings (e.g., $2/unit), printed circuit board (PCB) space savings (e.g., reduction in required PCB space of greater than 500 mm$^2$), reduced power loss or dissipation due to decreased components, improved ease of implementation of specific switching mode maintenance charge and/or pre-charge current modes, increased flexibility and cost effectiveness due to digital control (e.g., platform design flexibility and cost-effectiveness, reduced time to market), avoidance of analog tolerance issues (e.g., aging, temperature effects, drift, offset, etc.), improved reliability by monitoring external system voltage, current and internal battery variables.

The disclosed systems and methods may be advantageously implemented in a variety of battery system environments. Specific examples of environments in which the disclosed systems and methods may be implemented include, but are not limited to, Dell Smart Battery System ("SBS") architectures and Intel Narrow Voltage DC Extended Battery Life ("NVDC EBL") systems. In one particularly exemplary embodiment, the disclosed systems and methods may be implemented to provide a relatively low cost rechargeable power source platform where a single battery pack is supported with relatively low charge current, e.g., less than or equal to about 0.5 C (cell current rate). This may be implemented, for example, in one embodiment with no express charge.

In one respect, disclosed herein is a battery system, including: one or more battery cells; and charge regulation circuitry integrated within the battery system. The charge regulation circuitry may include a microcontroller within the battery system that is also configured to manage operation of the battery system.

In another respect, disclosed herein is a battery system for a portable information handling system configured to be coupled to a battery charging apparatus, the battery system including: one or more battery cells; battery current control circuitry configured to be coupled between the battery charging apparatus and the one or more battery cells; and a battery management unit (BMU) coupled to the battery current control circuitry. The BMU may be configured to monitor one or more operating parameters of the battery charging apparatus and to control operation of the battery current control circuitry to perform one or more charger regulation tasks, and to monitor one or more operating parameters of the battery system and to control operation of the battery current control circuitry to perform one or more battery system management tasks.

In another respect, disclosed herein is a method of charging one or more battery cells of a battery system coupled to a battery charging apparatus, including: receiving a charging current in the battery system from the battery charging apparatus, the battery system including charge regulation circuitry integrated within the battery system and the integrated charge regulation circuitry including a microcontroller; and using the microcontroller of the integrated charge regulation circuitry to regulate the charging current received in the battery system and to manage operation of the battery system.

DESCRIPTION OF ILLUSTRATIVE EMBODIMENTS

Figure 1:
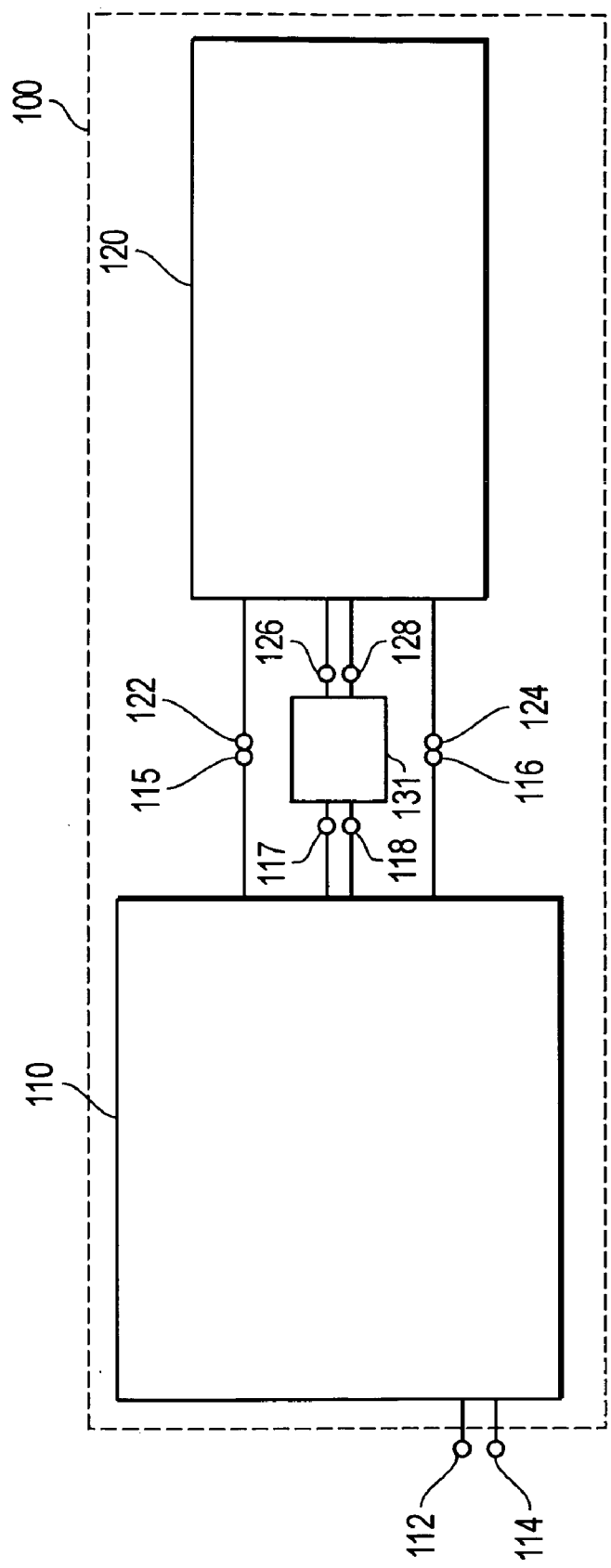
FIG. 1 is a block diagram of a conventional portable electronic device and battery charging apparatus.
Figure 2:
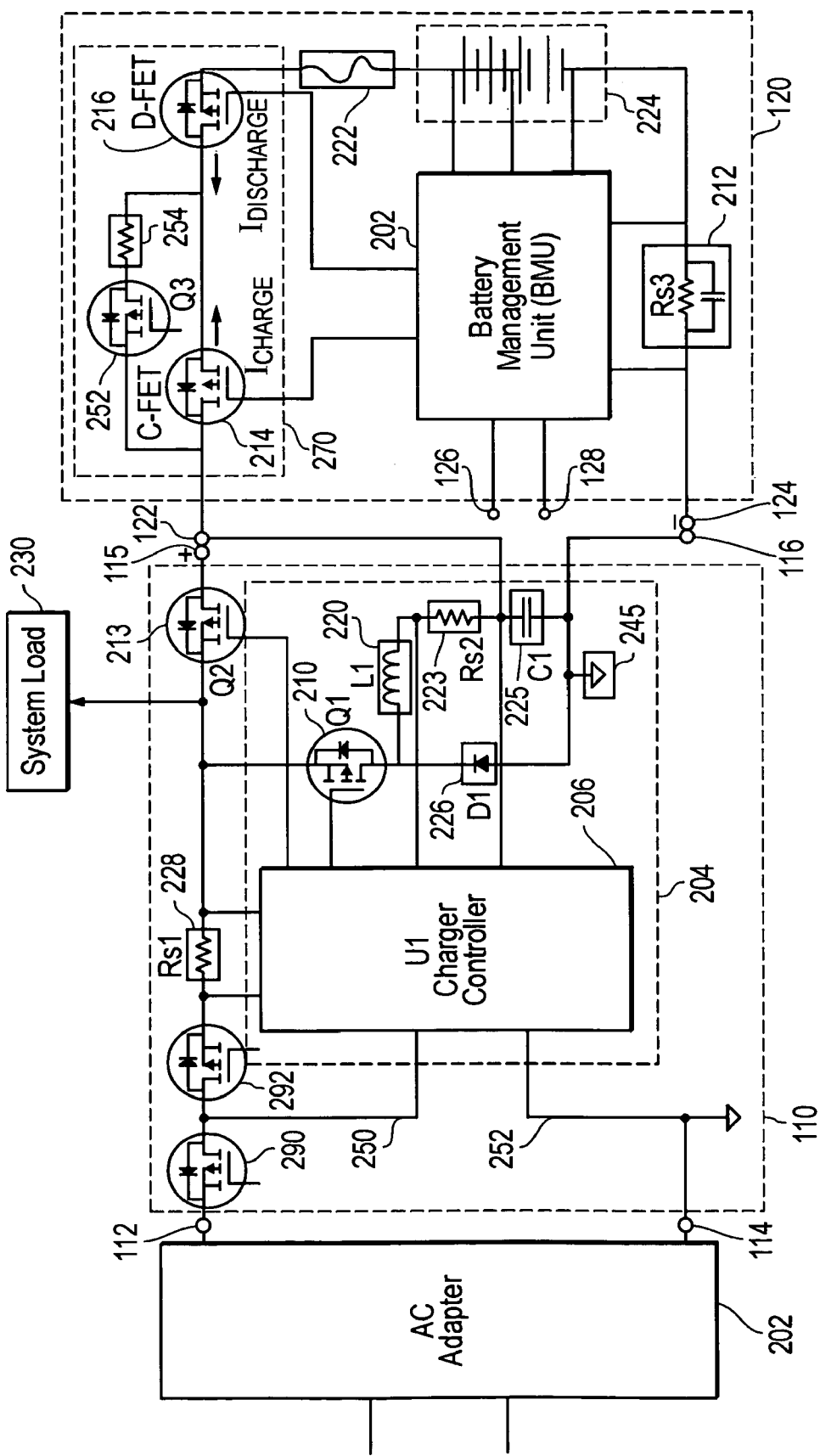
FIG. 2 is a block diagram of a conventional battery system coupled to a battery charging apparatus.
Figure 3:
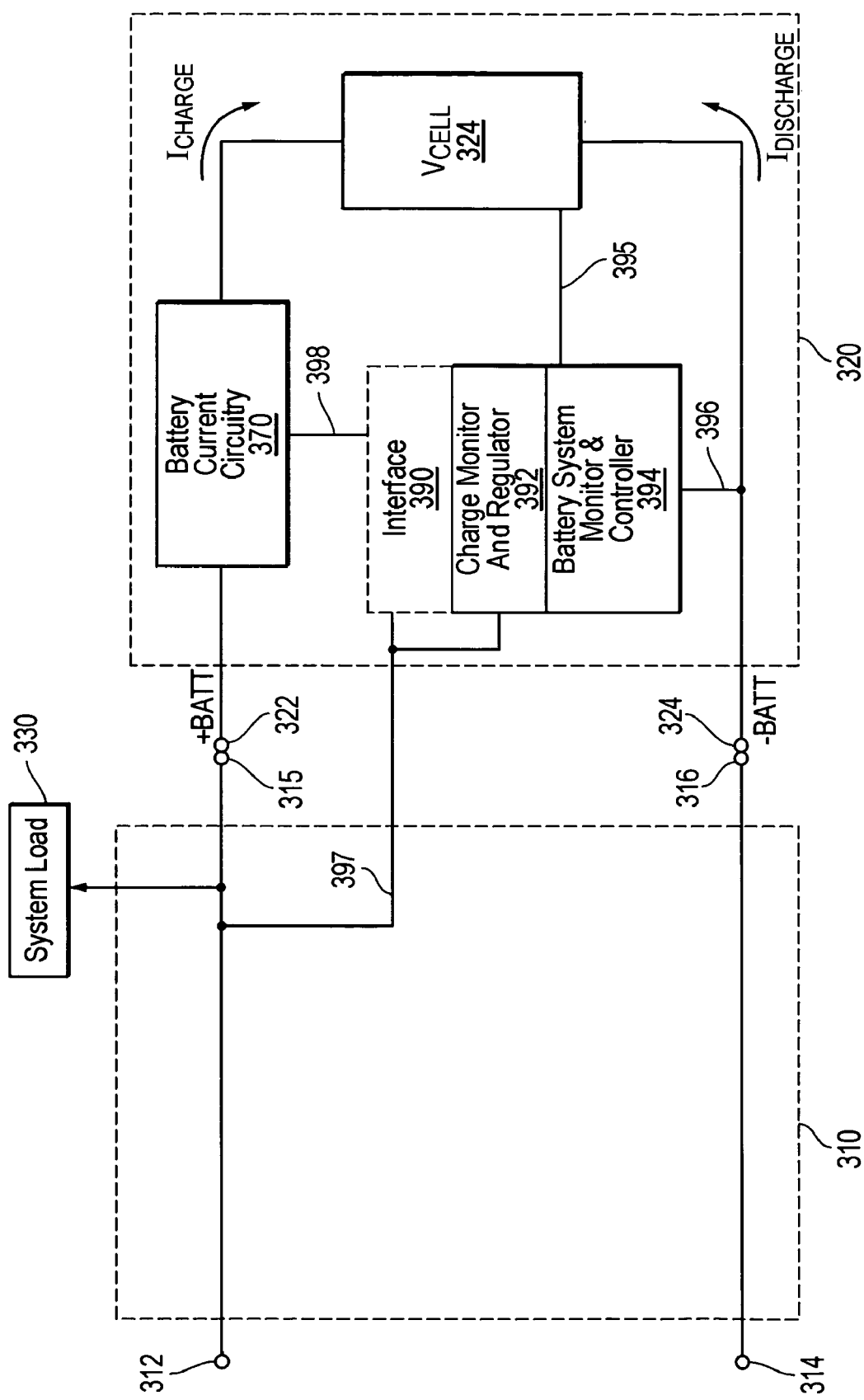
FIG. 3 is a block diagram of a battery system coupled to a battery charging apparatus according to one embodiment of the disclosed systems and methods.

FIG. 3 shows a battery system 320 coupled to a battery charging apparatus 310 according to one embodiment of the disclosed systems and methods. Battery system 320 and battery charging apparatus 310 may be configured stand alone devices, or may be provided as permanent or replaceable components of a portable electronic device, such as a portable information handling system. For example, battery system 320 may be configured as a stand alone source of current to a separate system load 330 (e.g., that may be circuitry of a separate or external device), or may be provided as a permanent or replaceable source of uninterruptible power (e.g., battery pack) for a system load 330 of a portable information handling system such as a notebook computer. Besides notebook computers, other examples of such portable electronic devices include, but are not limited to, portable telephone devices (e.g., cellular phones, cordless phones, etc.), personal digital assistant ("PDA") devices, MP3 players, cameras, computer peripherals, etc. In addition to portable electronic devices, it will be understood that the disclosed systems and methods may be implemented to power any other type of electronic device that is at least partially battery powered and that has electronic circuitry that is coupled to receive current from a battery system. In this regard, the disclosed systems and methods may be advantageously implemented in applications where smart batteries are employed.

As shown in FIG. 3, battery system 320 includes one or more battery cell/s 324 coupled to battery terminals 322 and 324 that are configured to be coupled to terminals 315 and 316 of battery charging apparatus 310. It will be understood that when battery system 320 is provided as an integrated component of an electronic device, battery charging apparatus 310 may also be provided as an integrated part of the same electronic device, or may be provided as an external device to the electronic device. Battery cell/s 324 may be any type of rechargeable battery cell/s or combination thereof that is suitable for recharging using two or more rates of charging current value. Examples of such battery cells include, but are not limited to, Li-ion battery cells, NiMH battery cells, nickel cadmium (NiCd) battery cells, lithium-polymer (Li-polymer) battery cells, etc.

Battery system 320 is also shown provided with battery current control circuitry 370 that is present to control flow of charging current to battery cell/s 324 of battery system 320, and to also control flow of discharge current from battery cell/s 324 of battery system 320. Charge monitor/regulator 392 is coupled to optional interface block 390 to control operation of battery current control circuitry 370 (e.g., by control signal or other suitable method) in order to control flow of battery charging current ($I_{CHARGE}$) between battery cell/s 324 and battery charging apparatus 310 and battery discharging current ($I_{DISCHARGE}$) between battery cell/s 324 and system load 330 in a manner as will be described further herein. In this regard, interface block 390 may be optionally present to enable performance of charger regulation tasks using components of battery current control circuitry 370.

As shown in FIG. 3, battery system 320 also includes charge monitor/regulator 392 that monitors one or more parameters of battery charging apparatus 310 and controls one or more charger regulation tasks (e.g., one or more of those tasks typically performed by a charger regulation circuitry of a separate battery charging apparatus), and battery system monitor/controller 394 that monitors one or more operating parameters of battery system 320 and controls one or more battery system management tasks (e.g., one or more of those tasks typically performed by a BMU or "gas gauge" of a battery system). In this embodiment, charger regulation circuitry may be advantageously integrated within battery system 320 by the combination of charge monitor/regulator 392, optional interface block 390 (when present), and those components of battery current control circuitry 370 that are controlled to perform one or more charger regulation tasks such as those described further herein (e.g., switching mode maintenance charge, power selection).

It will be understood that optional interface block 390, charge monitor/regulator 392 and battery system monitor/controller 394 may each be implemented using any circuitry and/or control logic configuration suitable for performing the tasks thereof. For example, in one embodiment, one or more features of interface block 390, charge monitor/regulator 392 and battery system monitor/controller 394 may be implemented using a controller (e.g., processor and associated firmware) that is integral to battery system 320 or using any other suitable configuration of microcontroller/microprocessor, firmware and/or software that interfaces with battery system circuitry/components. Furthermore, it will be understood that the tasks of interface block 390, charge monitor/regulator 392 and battery system monitor/controller 394 may be performed by two or more separate components or may alternatively be performed by a single component.

In operation of the battery system and battery charging apparatus of FIG. 3, battery system monitor/controller 394 monitors voltage of battery cell/s 324 (e.g., via signal path 395) and flow of charge and discharge current within battery system 320 (e.g., via signal path 396). Charge monitor/regulator 392 monitors current flow within circuitry of battery charging apparatus 310 (e.g., via signal path 397). As shown, interface block 390 may also be configured to monitor current flow within circuitry of battery charging apparatus 310.

Still referring to the exemplary embodiment of FIG. 3, charge monitor/regulator 392 may be configured to control battery current control circuitry 370 (e.g., via control signal 398) in order to implement one or more charger regulation tasks. Specific examples of charger regulation tasks include, but are not limited to, implementation of switching mode maintenance charge by regulating charging current received from battery charging apparatus 310, selection of charge current path within battery current control circuitry 370, operation of charge monitor/regulator 392, etc. Battery system monitor/controller 394 may be configured to control battery current control circuitry 370 in order to implement one or more battery system management tasks. Specific examples of battery system management tasks included, but are not limited to, controlling charge FET and discharge FET switching elements within battery current control circuitry based upon the occurrence of battery over-voltage or under-voltage conditions or upon activation of sleep mode, disabling the battery pack upon failure of charge FET switching element, controlling components within battery current control circuitry 370 to produce required charging current (e.g., pre-charge current or any other charge current level required to meet the requirements of a particular battery system such as may be dictated by the number and type of battery cells, etc.), etc.

Figure 4:
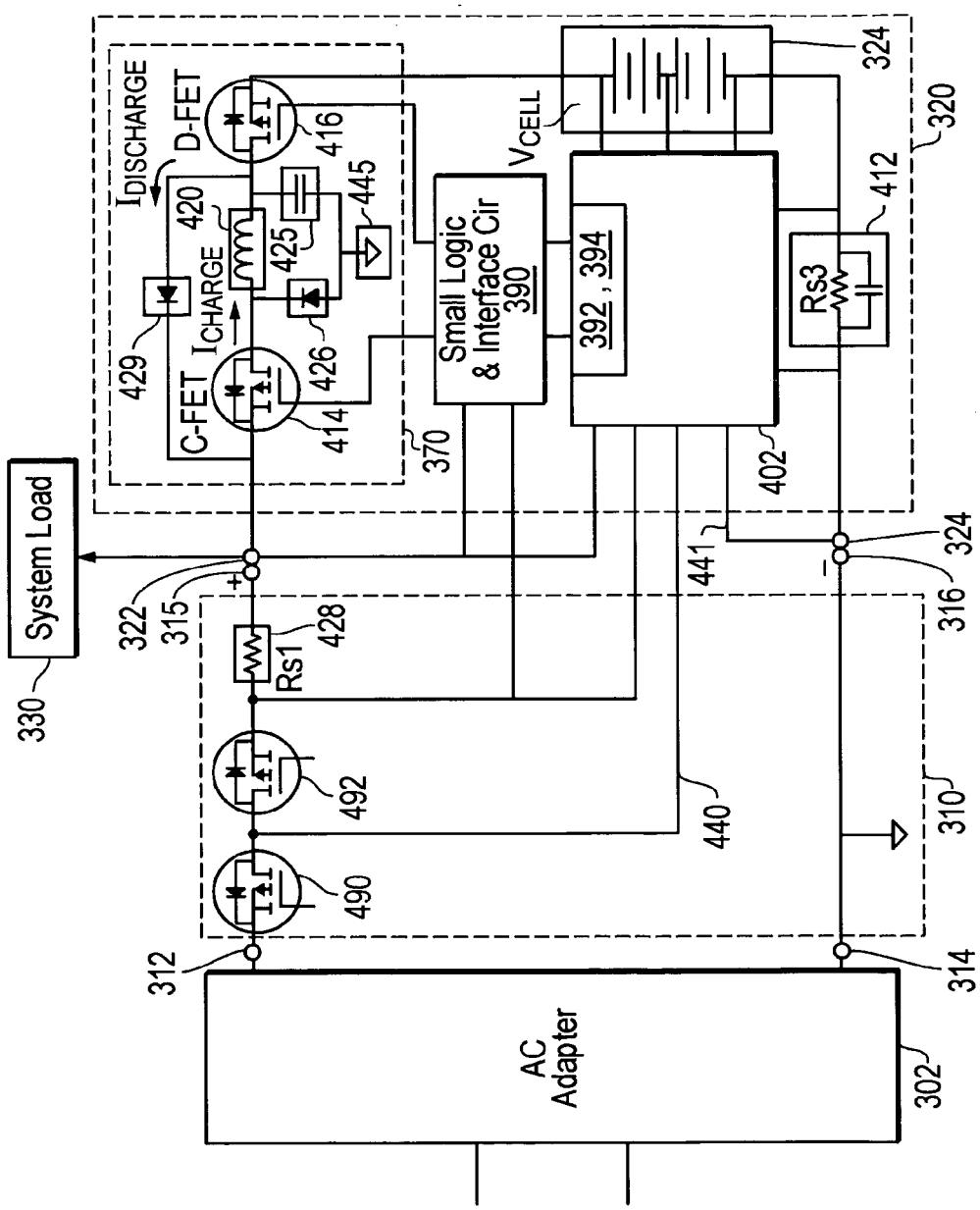
FIG. 4 is a block diagram of a battery system coupled to a battery charging apparatus according to one embodiment of the disclosed systems and methods.

FIG. 4 illustrates battery system 320 of FIG. 3 as it may be implemented according to one exemplary embodiment of the disclosed systems and methods. As shown in this exemplary embodiment, functions of charge monitor/regulator 392 and battery system monitor/controller 394 may be implemented by a battery management unit (BMU) 402 that is responsible for monitoring battery system operation and for controlling battery current control circuitry 370, although any other suitable configuration of circuitry, processor/s and/or control logic may be employed in other embodiments. In such an exemplary embodiment, BMU 402 may include a microcontroller and an analog front end ("AFE") that is coupled to monitor voltage of $V_{CELL}$ 324, to monitor current flow through current sense resistor (Rs3) 412, and to monitor current flow though current sense resistor (Rs1) 428. However, it is possible that BMU 402 may alternatively be provided with a microcontroller that is configured to perform these monitoring tasks.

In the illustrated embodiment of FIG. 4, a microcontroller within BMU 402 may be coupled to control battery current control circuitry 370 via control signals sent to interface block 390 that in this embodiment is provided in the form of small logic and interface circuitry that includes real-time analog logic (e.g., response bandwidth greater than or equal to about 10 megahertz) configured to interface between components of battery current control circuitry 370 and components of BMU 402, and provide relatively fast control response such as over-current protection by monitoring instantaneous current signal on 428. BMU 402 operates in a manner to be described below. Such a configuration may be employed to implement charger regulation features of the disclosed systems and methods within a battery system having a BMU 402. It will be understood, however, that a BMU of a battery system may alternatively be configured to interface directly with battery current control circuitry 370 and to control the components thereof, without the need for small logic and interface circuitry 390. As illustrated in FIG. 4, BMU 402 is configured to detect adapter input voltage through monitoring power terminals 440 and 441.

Figure 5:
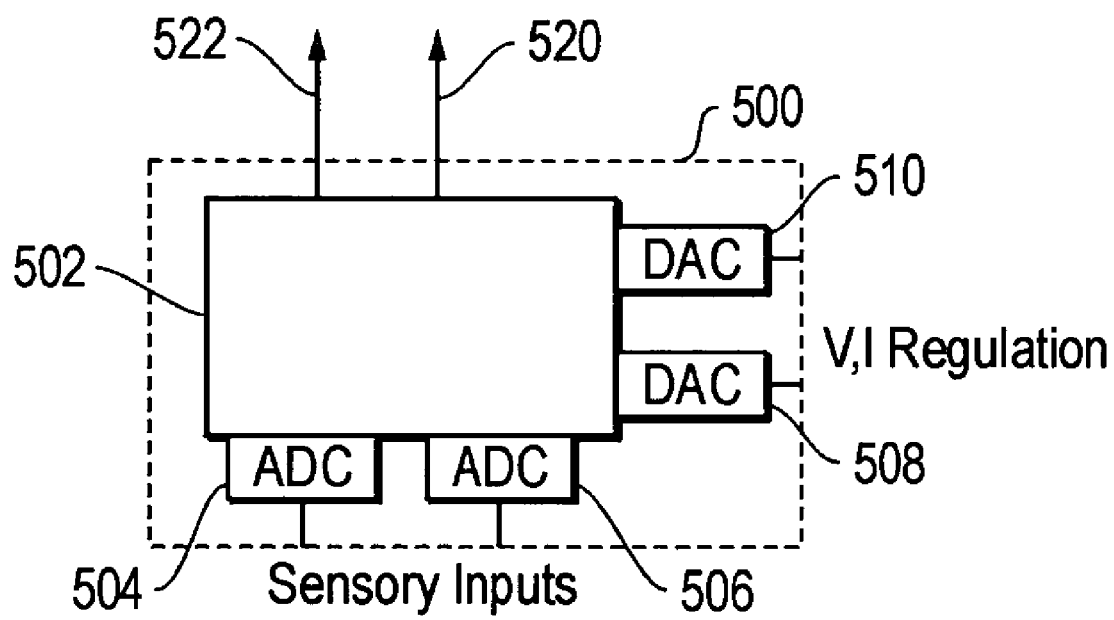
FIG. 5 is a block diagram of a microcontroller structure according to one embodiment of the disclosed systems and methods.

FIG. 5 shows one exemplary embodiment of a single chip microcontroller structure 500 that may be employed as microcontroller for BMU 402 of FIG. 4. Microcontroller 500 may include a digital processor 502, e.g., selected from the single chip Microchip PICMicroprocessor ("PICC" processor) family. As shown in FIG. 5, digital processor 502 may be coupled to sensory input analog to digital converters ("ADCs") 504 and 506, and to voltage and current regulation digital to analog converters ("DACs") 508 and 510.

Referring again to FIG. 4, battery current control circuitry 370 includes FET 414 that is a charge FET switching element controlled by battery system monitor/controller 394 and charger regulator controller 392 of BMU 402 through small logic and interface circuitry 390 to allow or disallow charging current to battery cell/s 324. Battery current control circuitry 370 also includes FET 416 that is a discharge FET switching element controlled by battery system monitor/controller 394 of BMU 402 through small logic and interface circuitry 390 to allow or disallow discharge current from the battery cell/s 324. As shown, body diodes are present across the source and drain of each FET switching element, i.e., to conduct charging current to the battery cell/s when the discharge FET switching element 416 is open, and to conduct discharging current from the battery cell/s when the charge FET switching element 414 is open.

During normal battery system charging operations discharge FET switching element 416 is placed in the closed state and charger monitor/regulator 392 of BMU 402 and small logic and interface circuitry 390 control charge FET switching element 414 by opening and closing FET 414 in order to implement relatively high frequency switching mode maintenance charge by regulating duty-ratio of controlled pulses provided from battery charging apparatus 310 to battery system 320 through inductor (L1) 420. During charging operations, flow of charging current through inductor 420 is monitored by 394 of BMU 402 by sensing current flow through current sense resistor (Rs3) 412. Meanwhile, total output current from adapter is also monitored by 390 and 394/392 through current sense resistor (Rs1) 428. Regulator controller 392 may be configured to real-time reduce pulse width if detected adapter output current (drawn by system load 330 and battery charging current) is greater than its rated output current, and vice versa. At the same time, battery system monitor/controller 394 of BMU 402 monitors voltage of battery cell/s 324. If a battery over-voltage condition is detected, battery system monitor/controller 394 opens the charge FET switching element 414 to prevent further charging of the battery cell/s until the over-voltage condition is no longer present.

Still referring to FIG. 4, charge monitor/regulator 392 may be configured to perform power selection within battery current control circuitry 370 of FIG. 4 by controlling charge FET switching element 414 so that FET 414 is closed when voltage of battery charging apparatus 310 is high relative to battery system 320 (e.g., when adapter 302 is supplying current during charging of battery system 320), but so that FET 414 is open when voltage of battery charging apparatus 310 is low relative to battery system 320 (e.g., when adapter 302 is supplying no current and when battery cell/s 324 are supplying current to system load 330 that is coupled to battery system 320, such as circuitry of a portable information handling system or other portable electronic device). In this regard, when coupled circuitry is operating on current battery power, FET switching element 414 is open in order to bypass inductor 420 and provide a more direct current path from battery cell/s 324 to coupled electronic circuitry through closed discharge FET 416 and diode 429. When adapter 302 is supplying current to charge battery cell/s 324, charge FET 414 is controlled so that charging current is supplied to battery cell/s 324 through inductor 420 and closed discharge FET 416.

Thus, in the illustrated embodiment of FIG. 4, charger regulation circuitry may be advantageously integrated within battery system 320 by the combination of charge monitor/regulator 392, optional logic and interface block 390 (when present), and those components of battery current control circuitry 370 (e.g., charge FET switching element 414, inductor 420 and capacitor 425) that are controlled to perform one or more charger regulation tasks such as those described herein (e.g., switching mode maintenance charge, power selection).

Still referring to the embodiment of FIG. 4, if a battery under-voltage (or over-discharge) condition is detected, battery system monitor/controller 394 of BMU 402 opens the discharge FET switching element 416 to prevent further discharging of the battery cell/s until the under-voltage condition is no longer present. Battery system monitor/controller 394 may also open the charge FET switching element 414 when the battery pack is in sleep mode.

As shown in FIG. 4, a current sense resistor (Rs3) 412 is present in the battery pack circuitry to allow microcontroller and AFE of BMU 402 to monitor charging current to the battery cell/s. If the charge FET switching element 414 is supposed to be open (e.g., during sleep mode or battery overvoltage condition) but charging current is detected, battery system monitor/controller 394 of BMU 402 may be configured to permanently disable the battery pack by blowing an optional inline fuse (not shown) that may be present in the battery system circuitry (e.g., coupled in series between $V_{CELL}$ 324 and battery current control circuitry 370) to open the battery system circuitry and prevent further over-charging.

In one embodiment, battery system monitor/control of BMU 402 may be configured to initiate pre-charge mode when BMU 402 detects that voltage of battery cell/s 324 is below the predetermined low voltage level and the pre-charge current level is needed. During pre-charge mode, battery system monitor/control of BMU 402 operates by regulating current to meet pre-charge requirement using signal 398 of FIG. 3 (e.g.,. by controlling C-FET 414 of FIG. 4) in order to limit the charging current provided to battery cell/s 324 to the lower pre-charge current level. When voltage of battery cell/s 324 reaches the predetermined low voltage threshold, battery system monitor/control of BMU allows the full charging current to be provided to battery cell/s 324.

As further illustrated in FIG. 4, battery current control circuitry 370 includes ground connection 445. Also shown present within charging apparatus 310 is optional soft start FET 490 provided for purposes of limiting the startup inrush current from adapter 302, and isolation FET 492 provided for purposes of isolating power supply of battery when no current is supplied by adapter 302, e.g., when battery system 320 is supplying current from battery cell/s 324 to power circuitry of system load 330 coupled to battery system 320, e.g., circuitry of a portable electronic device such as portable information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A replaceable battery pack for an information handling system, comprising:
   one or more battery cells; and
   charger regulation circuitry integrated and contained within said replaceable battery pack, said charger regulation circuitry including analog circuitry configured to adjust charging voltage to said one or more battery cells, and said charger regulation circuitry being configured to adjust charging current to said one or more battery cells to produce two or more charging current values;
   wherein said replaceable battery pack is configured as a replaceable source of power for a system load of said information handling system, said replaceable battery pack being provided with one or more terminals that separate said replaceable battery pack from other components of said information handling system including said system load;
   wherein said one or more terminals of said replaceable battery pack are configured to be temporarily coupled to and receive current from a battery charging apparatus of said information handling system, said battery charging apparatus being separated from said replaceable battery pack by said one or more terminals and being integrated and contained within said information handling system, and said replaceable battery pack being replaceable at said one or more terminals with respect to said batten charging apparatus and other components of said information handling system including said system load;
   wherein said charger regulation circuitry has a single microcontroller integrated and contained within said replaceable battery pack and separated by said one or more terminals from said battery charging apparatus and other components of said information handling system including said system load;
   wherein said single microcontroller contained within said replaceable battery pack has two current sense inputs, a first one of said current sense inputs being provided from outside said replaceable battery pack to monitor a flow of current within said separate battery charging apparatus of said information handling system, and a second one of said current sense inputs being provided from inside said replaceable battery pack to monitor a flow of current within said replaceable battery pack;
   wherein said single microcontroller is configured to use said first current sense input to monitor a flow of current within said separate battery charging apparatus of said information handling system; and
   wherein said single microcontroller is configured to use said second current sense input to monitor a flow of current within said replaceable battery pack.

2. The replaceable battery pack of claim 1, wherein said replaceable battery pack further comprises:
   battery current control circuitry integrated and contained within said replaceable battery pack and configured to be coupled between said battery charging apparatus and said one or more battery cells when said one or more terminals of said replaceable battery pack are temporarily coupled to said battery charging apparatus, said integrated charger regulation circuitry of said replaceable batten pack further comprising one or more components of said battery current control circuitry;
   a battery system monitor/controller coupled to monitor flow of charge and discharge current within said replaceable battery pack using said second current sense input, and to control operation of one or more components of said battery current control circuitry, said battery system monitor/controller being implemented by said microcontroller; and
   a charge monitor/regulator coupled to monitor current flow within circuitry of said battery charging apparatus using said first current sense input and to control operation of one or more components of said battery current control circuitry, said charge monitor/regulator being implemented by said microcontroller.

3. The replaceable battery pack of claim 2, wherein said replaceable battery pack comprises a battery management unit (BMU), said BMU comprising said microcontroller and an analog front end.

4. The replaceable battery pack of claim 2, wherein said battery current control circuitry comprises a charge FET switching element, an inductor and a capacitor; and wherein said charge FET switching element is controlled by said charge monitor/regulator; said charge FET switching element, inductor and capacitor comprising at least a portion of said charger regulation circuitry.

5. The replaceable battery pack of claim 4, wherein said battery current control circuitry comprises a discharge FET switching element that is controlled by said battery system monitor/controller.

6. A replaceable battery pack for a portable information handling system configured as a replaceable source of power for a system load of said portable information handling system and also configured to be temporarily coupled to a battery charging apparatus of said portable information handling system, said replaceable battery pack comprising:
   one or more battery cells;
   one or more terminals configured to separate said replaceable battery pack from other components of said information handling system including said system load and configured to be coupled to and receive current from said battery charging apparatus of said portable information handling system, said battery charging apparatus being separated from said replaceable battery pack by said one or more terminals and being integrated and contained within said portable information handling system, and said replaceable battery pack being replaceable at said one or more terminals with respect to said battery charging apparatus and other components of said information handling system including said system load;
   battery current control circuitry integrated and contained within said replaceable battery pack and configured to be coupled between said battery charging apparatus and said one or more battery cells to receive current from said battery charging apparatus when said one or more terminals of said replaceable battery pack are temporarily coupled to said battery charging apparatus; and
   a single battery management unit (BMU) integrated and contained within said replaceable battery pack and coupled to said battery current control circuitry, said single BMU being separated by said one or more terminals from said battery charging apparatus and other components of said portable information handling system including said system load;
   wherein said single BMU contained within said replaceable battery pack has two current sense inputs, a first one of said current sense inputs being provided from outside said replaceable battery pack to monitor a flow of current within said separate battery charging apparatus of said portable information handling system, and a second one of said current sense inputs being provided from inside said replaceable battery pack to monitor a flow of current within said replaceable battery pack;
   wherein said single BMU is configured to monitor one or more operating parameters of said separate battery charging apparatus by using said first current sense input to monitor a flow of current within said separate battery charging apparatus of said information handling system, and to control operation of said battery current control circuitry to perform one or more charger regulation tasks;

wherein said single BMU is configured to control said battery current control circuitry to adjust charging current to said one or more battery cells to produce two or more charging current values;

wherein said single BMU is configured to adjust charging voltage to said one or more battery cells; and wherein said single BMU is configured to monitor one or more operating parameters of said replaceable battery pack by using said second current sense input to monitor a flow of current within said replaceable battery pack, and to control operation of said battery current control circuitry to perform one or more battery system management tasks; and wherein said battery current control circuitry comprises an inductor configured to be coupled between said battery charging apparatus and said one or more battery cells.

7. The replaceable battery pack of claim 6, wherein said BMU comprises a microcontroller, said microcontroller being coupled to control said battery current control circuitry to adjust charging current to said one or more battery cells.

8. The replaceable battery pack of claim 6, wherein said battery current control circuitry comprises a charge FET switching element and a discharge FET switching element; wherein said BMU is configured to control operation of said charge FET switching element to perform said one or more charger regulation tasks; and wherein said BMU is configured to control operation of at least one of said charge FET and discharge FET switching elements to perform said one or more battery system management tasks.

9. The replaceable battery pack of claim 8, wherein said one or more charger regulation tasks comprise at least one of implementing switching mode maintenance charging of said one or more battery cells by opening and closing said charge FET switching element to regulate switching frequency of controlled pulses provided from said battery charging apparatus to said replaceable battery pack, selecting charge current path through an inductor within said battery current control circuitry using said charge FET; and wherein said one or more battery system management tasks comprises opening said charge FET switching element to prevent further charging of said one or more battery when an over-voltage condition of said one or more battery cells is detected, opening said discharge FET switching element when an under-voltage condition of said one or more battery cells is detected, controlling disabling said replaceable battery pack upon failure of said charge FET switching element, controlling one or more components within said battery current control circuitry to produce required charging current, or a combination thereof.

10. The replaceable battery pack of claim 6, wherein said replaceable battery pack further comprises small logic and interface circuitry coupled to interface between said BMU and said battery current control circuitry.

11. A portable information handling system comprising said battery charging apparatus and said replaceable battery pack of claim 6.

12. A method of charging one or more battery cells of a replaceable battery pack temporarily coupled to a battery charging apparatus of an information handling system, comprising:

receiving a charging current in said replaceable battery pack from said battery charging apparatus, said replaceable battery pack comprising charger regulation circuitry integrated and contained within said replaceable battery pack and said integrated charger regulation circuitry comprising a microcontroller and analog circuitry;

using said microcontroller and analog circuitry of said integrated charger regulation circuitry to regulate said charging current received in said replaceable battery pack to adjust charging voltage to said one or more battery cells; and adjusting said charging current to said one or more battery cells to produce two or more charging current values;

wherein said replaceable battery pack is configured as a replaceable source of power for a system load of said information handling system, said replaceable battery pack being provided with one or more terminals that separate said replaceable battery pack from other components of said information handling system including said system load when said replaceable battery pack is temporarily coupled to said battery charging apparatus;

wherein said one or more terminals of said replaceable battery pack are coupled to said battery charging apparatus of said information handling system, said battery charging apparatus being separated from said replaceable battery pack by said one or more terminals and being integrated and contained within said information handling system, said replaceable battery pack being replaceable at said one or more terminals with respect to said battery charging apparatus and other components of said information handling system including said system load, and said method comprising receiving said current at said one or more terminals from said battery charging apparatus of said information handling system;

wherein said charger regulation circuitry has a single microcontroller integrated and contained within said replaceable battery pack and separated by said one or more terminals from said battery charging apparatus and other components of said information handling system including said system load;

wherein said single microcontroller contained within said replaceable battery pack has two current sense inputs, a first one of said current sense inputs being provided from outside said replaceable battery pack to monitor a flow of current within said separate battery charging apparatus of said information handling system, and a second one of said current sense inputs being provided from inside said replaceable battery pack to monitor a flow of current within said replaceable battery pack;

wherein said method further comprises using said single microcontroller to monitor a flow of current within said separate battery charging apparatus of said information handling system based on said first current sense input to said single microcontroller; and wherein said method further comprises using said single microcontroller to monitor a flow of current within said replaceable battery pack based on said second current sense input to said single microcontroller.

13. The method of claim 12, wherein said replaceable battery pack further comprises a battery system monitor/controller coupled to control operation of one or more components of said battery current control circuitry, said battery system monitor/controller being implemented by said microcontroller; wherein said replaceable battery pack further comprises a charge monitor/regulator coupled to control operation of one or more components of said battery current control circuitry, said charge monitor/regulator being implemented by said microcontroller; and wherein said method further comprises:

using said charge monitor/regulator to monitor current flow within circuitry of said battery charging apparatus using said first current sense input, and to control operation of said battery current control circuitry to perform one or more charger regulation tasks; and using said battery system monitor/controller to monitor flow of charge and discharge current within said replaceable battery pack using said second current sense input, and to control operation of said battery current control circuitry to perform one or more battery system management tasks.

14. The method of claim 12, wherein said replaceable battery pack further comprises a battery management unit (BMU) coupled to said battery current control circuitry, said BMU comprising said microcontroller and an analog front end.

15. The method of claim 14, wherein said replaceable battery pack further comprises small logic and interface circuitry coupled to interface between said BMU and said battery current control circuitry.

16. The method of claim 13, wherein said battery current control circuitry comprises a charge FET switching element and a discharge FET switching element, and wherein said method further comprises:

using said microcontroller to control operation of said charge FET switching element to perform said one or more charger regulation tasks; and using said microcontroller to control operation of at least one of said charge FET and discharge FET switching elements to perform said one or more battery system management tasks.

17. The method of claim 16, wherein said one or more charger regulation tasks comprise at least one of implementing switching mode maintenance charging of said one or more battery cells by opening and closing said charge FET switching element to regulate switching frequency of controlled pulses provided from said battery charging apparatus to said replaceable battery pack, selecting a charge path through an inductor within said battery current control circuitry using said charge FET element; and wherein said one or more battery system management tasks comprises opening said charge FET switching element to prevent further charging of said one or more battery when an over-voltage condition of said one or more battery cells is detected, opening said discharge FET switching element when an under-voltage condition of said one or more battery cells is detected, controlling disabling said replaceable battery pack upon failure of said charge FET switching element, controlling one or more components within said battery current control circuitry to produce required charging current, or a combination thereof.

18. The replaceable battery pack of claim 1, wherein said integrated charger regulation circuitry further comprises an inductor configured to be coupled between said battery charging apparatus and said one or more battery cells when said one or more terminals of said replaceable battery pack are temporarily coupled to said battery charging apparatus.

19. The replaceable battery pack of claim 2, wherein said battery current control circuitry comprises analog circuitry; wherein said analog circuitry of said battery current control circuitry is controlled to perform one or more charger regulation tasks; and wherein said charger regulation tasks comprise at least one of switching mode maintenance charge or power selection.

20. The method of claim 12, wherein said integrated charger regulation circuitry further comprises an inductor coupled between said battery charging apparatus and said one or more battery cells when said replaceable battery pack is temporarily coupled to said battery charging apparatus.

21. An information handling system, comprising:

a first assembly comprising a system load and a battery charging apparatus integrated and contained together entirely within said first assembly;

a second assembly separate from said first assembly and comprising a replaceable battery pack integrated and contained entirely within said second assembly, said replaceable battery pack comprising:

one or more battery cells, and charger regulation circuitry, said charger regulation circuitry including analog circuitry configured to adjust charging voltage to said one or more battery cells, and said charger regulation circuitry being configured to adjust charging current to said one or more battery cells to produce two or more charging current values;

wherein said replaceable battery pack is configured as a replaceable source of power for said system load of said information handling system, said replaceable battery pack being provided with one or more terminals that separate said replaceable battery pack from said first assembly of said information handling system including said system load;

wherein said one or more terminals of said replaceable battery pack are configured to be temporarily coupled to and receive current from said battery charging apparatus of said first assembly, said battery charging apparatus of said first assembly being separated from said replaceable battery pack of said second assembly by said one or more terminals, and said replaceable battery pack of said second assembly being replaceable at said one or more terminals with respect to said battery charging apparatus and other components of said first assembly including said system load;

wherein said charger regulation circuitry of said second assembly has a single microcontroller integrated and contained within said replaceable battery pack and separated by said one or more terminals from said battery charging apparatus and other components of said first assembly including said system load;

wherein said single microcontroller contained within said replaceable battery pack of said second assembly has two current sense inputs, a first one of said current sense inputs being provided from outside said second assembly to monitor a flow of current within said separate battery charging apparatus of said first assembly, and a second one of said current sense inputs being provided from inside said second assembly to monitor a flow of current within said replaceable battery pack;

wherein said single microcontroller is configured to use said first current sense input to monitor a flow of current within said separate battery charging apparatus of said first assembly; and wherein said single microcontroller is configured to use said second current sense input to monitor a flow of current within said replaceable battery pack of said second assembly.

* * * * *

UNITED STATES PATENT AND TRADEMARK OFFICE
CERTIFICATE OF CORRECTION

PATENT NO. : 7,391,184 B2  Page 1 of 1
APPLICATION NO. : 11/058781
DATED : June 24, 2008
INVENTOR(S) : Luo et al.

It is certified that error appears in the above-identified patent and that said Letters Patent is hereby corrected as shown below:

In claim 1, column 11, line 30, delete "batten," and insert --battery--.
In claim 1, column 11, line 62, delete "batten," and insert --battery--.

Signed and Sealed this

Second Day of September, 2008

JON W. DUDAS
*Director of the United States Patent and Trademark Office*